April 10, 1934.  C. BREER ET AL  1,954,196
SHOCK ABSORBER CONTROL
Filed July 1, 1931
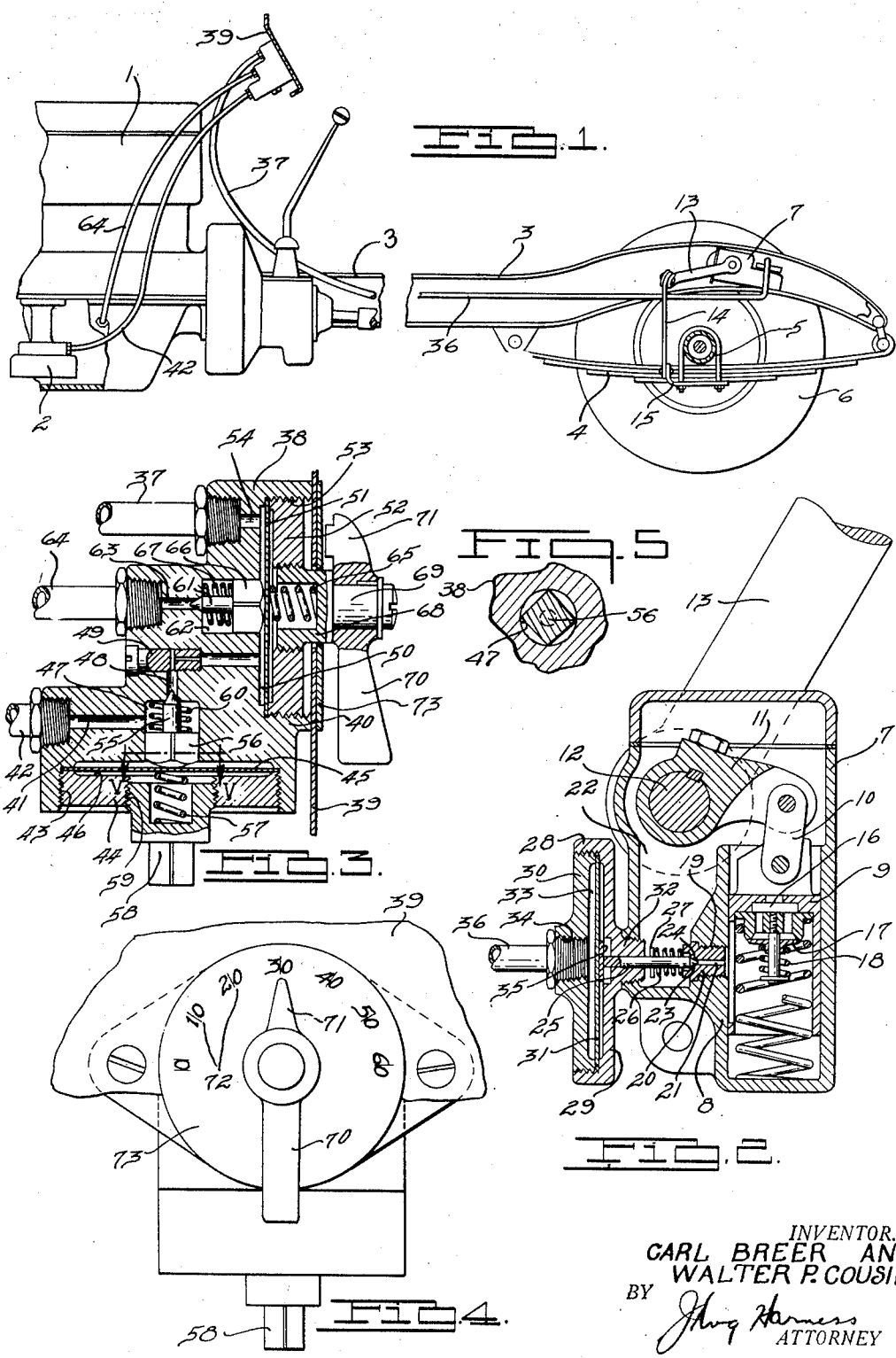
INVENTOR.
CARL BREER AND
WALTER P. COUSINO.
BY
ATTORNEY Patented Apr. 10, 1934

1,954,196

UNITED STATES PATENT OFFICE 1,954,196

SHOCK ABSORBER CONTROL

Carl Breer and Walter P. Cousino, Detroit, Mich., assignors to Chrysler Corporation, Detroit, Mich., a corporation of Delaware Application July 1, 1931, Serial No. 548,172

7 Claims. (Cl. 188—87)

This invention relates to control apparatus for vehicle shock absorbers.

In order to obtain maximum riding comfort in a vehicle, it is necessary to condition the shock absorbing devices which govern relative movement of the sprung and unsprung parts of the vehicle for operation on roads of various degrees of roughness. When a vehicle is driven over city streets having relatively smooth surfaces, extremely free action of the shock absorbers is desirable to absorb the slight shocks and vibrations which are created, but when the vehicle is driven over rough country roads substantially rigid resistance to relative movement of the sprung and unsprung parts is required to prevent extreme downward movement or rebounding of the sprung portion.

The main objects of the invention are to provide improved apparatus which is controllable from the driver's seat of the vehicle for changing the characteristics of the shock absorbing devices thereof; to provide means of this character which is actuated by the pressure of the lubricant in the lubricating system of the engine of the vehicle; to provide hydraulically operated regulating apparatus of this kind which is not effected by relative movement of the sprung and unsprung parts of the vehicle; to provide apparatus of this character by which the shock absorbers may be conditioned to resist relative movement of the sprung and unsprung parts of a vehicle with selected degrees of rigidity; and to provide means in the hydraulic control apparatus for preventing the pressure of the lubricating system from decreasing below a predetermined minimum in the event of leakage in the control system.

An illustrative embodiment of our invention is shown in the accompanying drawing, in which:

Fig. 1 is a fragmentary side elevation of a vehicle chassis which is equipped with our improved shock absorber control apparatus.

Fig. 2 is a vertical section of a shock absorber showing the means by which changes in the characteristics of the shock absorber are brought about.

Fig. 3 is a vertical section of a control valve embodying our invention.

Fig. 4 is a front elevation of the control valve shown in section in Fig. 3.

Fig. 5 is a fragmentary horizontal sectional view taken on the line V—V of Fig. 3.

In the form shown, our improved shock absorber control system is illustrated in conjunction with a vehicle having an internal combustion engine 1 which is provided with a pressure lubricating system that includes an oil pump 2. The vehicle chassis includes a chassis frame 3 which is resiliently mounted by conventional leaf springs 4 upon the rear axle 5 that supports the road wheels 6. The front end of the chassis frame (not shown) is resiliently supported on the front axle in a similar conventional manner. The axles and road wheels constitute the unsprung part of the vehicle and the chassis frame together with all of the members which are normally supported thereon form the sprung portion of the vehicle.

Relative movement of the sprung and unsprung parts of the vehicle is resisted by shock absorbers 7 which coact between the sprung and unsprung parts in a conventional manner. For the purpose of illustration, a shock absorber of the hydraulic type, which acts only to govern rebounding of the sprung portion of the vehicle, is shown, but the control apparatus may also be applied to other types of shock absorbers including those of the double acting type. Four shock absorbers are preferably employed, one being located in related proximity to each of the vehicle springs.

Each shock absorber includes a housing having an internal cylinder 8 in which a piston 9 is slidably mounted. The piston 9 is pivotally connected by a link 10 to an arm 11 of a crank which has a shaft portion 12 journaled in the walls of the housing and an external lever 13. The lever 13 is pivotally connected by a link 14 to a bracket 15 fixed on the axle 5. During rebounding of the sprung portion of the vehicle relative to the unsprung portion thereof, the lever 13 is turned in a clockwise direction, as viewed in Fig. 2, and the internal arm 11 of the crank is turned in a corresponding direction so as to urge the piston 9 inwardly with respect to its cylinder. During the return movement of the sprung portion of the chassis frame from its rebounded position to its normal position, the external lever 13 and the internal arm 11 are rotated in a counterclockwise direction so as to move the piston 9 outwardly with respect to the cylinder.

The piston 9 has a central opening 16 through which a liquid medium, such as oil, flows to the interior of the cylinder during outward movement of the piston. The inlet opening 16 is provided with a one-way check valve 17 which is normally closed by a spring 18 during inward movement of the piston so as to place the oil in the interior of the cylinder 8 under compression.

Formed in the side wall of the cylinder 8 is an opening 19 in which a metering plug 20 having an outlet port 21 is threaded. The outlet port 21 permits the lubricant to escape from the cylinder into a chamber 22 at a relatively slow rate so as to resist rebounding of the sprung portion of the vehicle. The rigidity with which rebounding of the sprung portion of the vehicle is resisted depends primarily upon the capacity of the outlet port 21. For this reason, the characteristics of the shock absorber may be conveniently varied by varying the capacity of the outlet port.

This is accomplished in our improved control system by providing each shock absorber with a valve 23 which registers with a valve seat 24 and which is carried by a valve stem 25. The valve and valve stem 23 and 25, respectively, are normally urged toward a fully open position by a coil spring 26 that bears between the extremity of the metering plug 21 and a collar 27 fixed on the valve stem.

The outer end of the valve stem extends into a casing 28 preferably of cylindrical shape which includes a cup-shaped part 29 and a threaded disc shaped closure 30. The cup-shaped part 29 and the closure 30 are provided on their internal sides with registering shoulders between which the outer marginal portions of a disc-shaped diaphragm 31 are clamped. Formed on the cup-shaped part 29 of the casing 28 is a boss 32 which is threaded in an opening in the wall of the housing of the shock absorber. The space 33 within the casing 28, between the closure 30 and the diaphragm 31 thereof, is securely sealed by the clamped engagement between the outer marginal portions of the diaphragm and the adjacent shoulder. The closure 30 is provided with an inlet opening 34 through which fluid, such as oil, is admitted under pressure. The diaphragm 31 bears against an enlarged head 35 on the outer end of the valve stem 25 so as to oppose the action of the spring 26 for holding the valve 23 in selected partially closed positions corresponding to the pressure of the fluid in the space 33 of the casing 28.

The diaphragm inclosing casings 28 of all of the shock absorbers are connected together by conduits 36 which preferably lead to a common conduit 37 that is connected with a control unit 38 by which selected degrees of pressure may be maintained on all of the diaphragms. The control unit 38 is preferably mounted on the dash 39 of the vehicle in close proximity to the driver's seat where it may be conveniently manipulated. This unit includes a substantially solid body portion 40 having an inlet passage 41 which is preferably connected by a pipe 42 to the oil pump 2 of the internal combustion engine lubricating system.

Formed in the lower end of the body portion 40 is a recess 43 in which a closure 44 is threaded. The closure 44 and the body portion 40 are provided with registering shoulders between which the outer marginal portions of a diaphragm 45 are clamped. The diaphragm 45 provides a sealed chamber 46 at the inner end of the recess 43, which communicates with a cylindrical passage 47 that is joined with the inlet passage 41. The passage 47 has an outlet 48 in which is provided a metering plug 49 and it leads to a chamber 50 between a diaphragm 51 that is also firmly clamped between registering shoulders on the body portion 40 and on a closure 52 that is threaded in a recess 53 of the body portion, respectively. A passage 54 formed in the body portion of the control unit communicates at one end with the conduit 37 that leads to the shock absorbers and at its other end with the chamber 50 between the diaphragm 51 and the inner end of the recess 53 of the body portion.

Slidably mounted in the cylindrical passage 47 that communicates with the inlet passage 41 is a valve 55 having a rectangular shaped head 56 engaging the diaphragm 45. The valve 55 registers with the inlet end of the passage 48 and is normally held in a closed position by a coil spring 57 that bears between the external side of the diaphragm 45 and a plug 58 that is threaded in a central opening 59 of the closure 44. A coil spring 60 which bears between the end of the cylindrical passage 47 and the head 56 opposes the valve closing action of the spring 57 but is of insufficient strength to independently open the valve 55.

The lubricant from the pump 2 of the engine lubricating system flows through the inlet passage 41 to the cylindrical passage 47 and passes between the cylindrical walls of the chamber 46 and the flat sides of the rectangular head 56 of the valve into the chamber 46 between the diaphragm 45 and the end wall of the recess 43. When the pressure of the lubricant in the lubricating system of the engine exceeds a predetermined degree, preferably thirty pounds, the diaphragm 45 compresses the coil spring 57 and allows the coil spring 60 to move the check valve 55 to an open position. This operation of the check valve permits the lubricant to flow through the passage 48 and the metering plug 49 to the chamber 50 between the diaphragm 51 and the inner end of the recess 53. The lubricant may then flow through the outlet 54 and conduits 37 and 36 to the interior of the diaphragm inclosing casing 28 where it acts upon the diaphragm 31 so as to hold the valve 23 of the shock absorber in a partially open position. The check valve 55 prevents the pressure of the lubricating system of the engine from being decreased below a predetermined minimum by leakage in the fluid pressure, shock absorber control system.

The degree of pressure to which the diaphragm 31 of the shock absorber metering means is subjected, is controlled by a variable relief or reduction valve 61 which is slidably mounted in a cylindrical passage 62 that communicates with the chamber 50 between the diaphragm 51 and the inner end of the recess 53. This relief valve registers with an outlet passage 63 that communicates with a return pipe 64 leading to the crank case of the engine and it is normally held in a closed position by a coil spring 65 which bears against the central portion of the diaphragm 51. The valve 61 has an enlarged rectangular shaped head 66 which bears against the internal side of the diaphragm 51 and it is normally urged toward an open position by a coil spring 67 that bears between the inner end of the cylindrical chamber 62 and the head 66. The coil spring 65 normally over-powers the coil spring 67 and retains the valve 61 in a closed position until the pressure upon the internal side of the diaphragm 51 is of sufficient amplitude to compress the coil spring 65. Under these conditions, the valve 61 is opened by the spring 67 so as to permit lubricant to escape through the passage 63 and to return to the crank case. In this manner the relief valve 61 maintains a predetermined constant pressure in the shock absorber control system which predetermines the rebound resisting characteristics of all the shock absorbers of the vehicle.

The amplitude of the pressure at which the medium in the control system is maintained constant may be varied by varying the compression of the coil spring 65. This is conveniently accomplished by the structure shown in Fig. 3, which includes an adjustable member 68 that is threaded in a central opening of the closure 52 and against which the outer end of the spring 65 bears. The adjustable member 68 has an externally protruding end portion 69 on which is splined an operating handle 70 for screwing the adjustable member inwardly and outwardly to vary the compression of the spring 65. The handle 70 has a pointed extremity 71 which is located in close proximity to a scale having numerals 72 formed on a disc 73 that is rigidly fixed to the dash 39 of the vehicle. The scale is preferably calibrated so as to disclose the pressure which is maintained in the control system by the various degrees of compression under which the spring 69 is held when the operating handle 70 is in diverse angular positions.

In operation, the shock absorber control system may be supplied with either a gaseous or a liquid medium from sources other than the engine lubricating system if desired. Regardless of the nature or source of the medium used, clockwise rotation of the operating handle 70 will place the spring 65 under increased compression requiring increased pressure on the internal side of the diaphragm 51 to open the relief valve. This results in maintaining the pressure upon the diaphragm 31 at a higher amplitude. The diaphragm 31 in turn holds the valve 23 closer to its seat restricting the flow of oil from the cylinder 8, thereby increasing the resistance to rebounding of the sprung portion of the vehicle. The rate at which oil is permitted to flow from the cylinder may be increased so as to reduce the resistance to rebounding of the unsprung part of the vehicle by turning the handle 70 in a counterclockwise direction. All of the shock absorbing devices of the vehicle are controlled simultaneously in this manner.

Although but one specific embodiment of this invention has herein been shown and described, it will be understood that various changes in the size, shape and arrangement of parts may be made without departing from the spirit of our invention and it is not our intention to limit its scope other than by the terms of the appended claims.

What we claim is:

1. In a vehicle including an engine having a pressure lubricating system, the combination with a shock absorber for controlling movement of relatively movable parts of said vehicle including a fluid pressure responsive variable member for predetermining the characteristics of said shock absorber, of a control system operable by the pressure of said lubricating system including a receptacle having an inlet and an outlet communicating with said lubricating system for circulating lubricant through said receptacle, a conduit communicating with the interior of said receptacle and said fluid pressure responsive member for varying the setting of the latter, and means for controlling the outlet of said receptacle so as to predetermine the pressure of the lubricant therein and in said conduit.

2. In a vehicle including an engine having a pressure lubricating system, the combination with a shock absorber for controlling movement of relatively movable parts of said vehicle including a fluid pressure responsive variable member for predetermining the characteristics of said shock absorber, of a control system operable by the pressure of said lubricating system including a receptacle having an inlet and an outlet communicating with said lubricating system for circulating lubricant through said receptacle, a conduit communicating with the interior of said receptacle and said fluid pressure responsive member for varying the setting of the latter, means for controlling the outlet of said receptacle so as to predetermine the pressure of the lubricant therein and in said conduit, and a valve for controlling the inlet of said receptacle adapted to admit lubricant from said lubricating system thereinto only when the pressure of said lubricating system exceeds a predetermined value.

3. In a vehicle including an engine having a pressure lubricating system, the combination with a hydraulic shock absorber including a closed fluid system and having a fluid pressure responsive variable valve means for predetermining the characteristics of said shock absorber, of a fluid pressure control system operable by the pressure of said lubricating system including a receptacle having an inlet and an outlet communicating with said lubricating system for circulating lubricant through said receptacle, a conduit communicating with the interior of said receptacle and with said fluid pressure responsive means for varying the setting of the latter, the lubricant in said control system being entirely separated from the fluid system of said shock absorber, and means for controlling the outlet of said receptacle so as to predetermine the pressure of the lubricant therein and in said conduit.

4. A fluid pressure control system for vehicle shock absorbers including a casing having an inlet communicating with a source of fluid pressure and an outlet for returning fluid from said casing to said source, apparatus communicating with the interior of said casing responsive to the pressure therein for varying the characteristics of said shock absorbers, a normally closed inlet valve in the inlet of said casing, a diaphragm responsive to the pressure of the source of fluid pressure adapted to open said inlet valve only when the pressure of said source exceeds a predetermined value, a normally closed outlet valve in the outlet of said casing, and a diaphragm responsive to the pressure in the interior of said casing adapted to open said outlet valve only when the pressure in said casing reaches a predetermined value.

5. A fluid pressure control system for vehicle shock absorbers including a casing having an inlet communicating with a source of fluid pressure and an outlet for returning fluid from said casing to said source, apparatus communicating with the interior of said casing responsive to the pressure therein for varying the characteristics of said shock absorbers, a valve in the outlet of said casing, adjustable means including a spring for normally holding said valve in a closed position, and a diaphragm responsive to the pressure in said casing adapted to open said valve only when the pressure in said casing exceeds a predetermined value established by the setting of said adjustable means.

6. A fluid pressure control system for vehicle shock absorbers including a casing having an inlet communicating with a source of fluid pressure and an outlet for returning fluid from said casing to said source, apparatus communicating with the interior of said casing responsive to the pressure therein for varying the characteristics of said shock absorbers, a valve in the outlet of said casing, adjustable means including a spring for normally holding said valve in a closed position, a diaphragm responsive to the pressure in said casing adapted to open said valve only when the pressure in said casing exceeds a predetermined value established by the setting of said adjustable means, an outlet valve in the outlet of said casing, means including a spring and an adjustable compressing member for normally holding said valve in a closed position, and a diaphragm responsive to the pressure of said source of fluid pressure adapted to open said outlet valve only when the pressure at said source exceeds a predetermined value established by the setting of said adjustable spring compressing member.

7. A control device for a hydraulic shock absorber for a vehicle propelled by a power device having a force feed lubricating system, the combination with a fluid flow control device of said shock absorber; an actuator for adjusting said fluid flow control device to vary the effective operation of the shock absorber; a fluid pressure operated mechanism for operating the actuator; a fluid pressure chamber connected to said mechanism; and a manually operable member for diverting fluid under pressure from the lubricating system of the power device to said fluid pressure chamber.

CARL BREER.
WALTER P. COUSINO.